United States Patent [19]

Rosner et al.

[11] 4,219,261
[45] Aug. 26, 1980

[54] PHOTOGRAPHIC CAMERA WITH A MEANS FOR COORDINATING AND INDICATING DEPTH OF FIELD FOCUSING AND OBJECTIVE SETTING VALUES

[76] Inventors: Ortwin Rosner, Hiltenspergerstrasse 58, 8000 Munchen 40; Karl-Peter Strauss, Am Feuerteich 9, 3300 Braunschweig-Volkmarode, both of Fed. Rep. of Germany

[21] Appl. No.: 968,333

[22] Filed: Dec. 11, 1978

[30] Foreign Application Priority Data

Dec. 12, 1977 [DE] Fed. Rep. of Germany ....... 2755368

[51] Int. Cl.² .................. G03B 3/08; G03B 17/18
[52] U.S. Cl. .................. 354/23 D; 354/60 L; 354/196; 354/198
[58] Field of Search .............. 354/25, 195, 196, 23 D, 354/60 L, 198

[56] References Cited

U.S. PATENT DOCUMENTS

4,154,517  5/1979  Tamura et al. ...................... 354/196

Primary Examiner—L. T. Hix
Assistant Examiner—William B. Perkey
Attorney, Agent, or Firm—Schwartz, Jeffery, Schwaab, Mack, Blumenthal & Koch

[57] ABSTRACT

A photographic camera having an objective, a viewfinder coupled to said objective and comprising means for converting the setting of the objective into electrical signal values, $x'_{actual}$, memory storage means for storing the electrical signal values, the memory storage means storing a first signal value, $x_v'$, corresponding to the objective setting associated with a far point desired to be photographed, and for storing a second signal value, $x_h'$, corresponding to the objective setting associated with a near point desired to be photographed, and calculator means connected to the memory storage means for automatically calculating a desired stop figure, $k_{desired}$, and a desired distance-setting value, $x'_{desired}$, associated with the first and second signal values.

16 Claims, 3 Drawing Figures

REFERENCE MARKS IN FIG. 3

FE   FILM PLANE
AP   EXIT PUPIL
F*   FOCAL POINT
$P'_v$   IMAGE OF $P_v$
$P'_h$   IMAGE OF $P_h$
$x'_{AP}$   POSITION OF AP BASED ON F*
$x'$   POSITION OF FILM (COLLECTING, RECEIVING) PLANE BASED ON F*, OFTEN ALSO CALLED THE "EXTENSION LENGTH"
$x'_v, x'_h$   POSITION OF IMAGES OF FORWARD OR REAR FOCAL PLANE
$z'$   DIAMETER OF THE PERMITTED CIRCLE OF DIVERGENCE IN THE IMAGE SPACE

PHOTOGRAPHIC CAMERA WITH A MEANS FOR COORDINATING AND INDICATING DEPTH OF FIELD FOCUSING AND OBJECTIVE SETTING VALUES

BACKGROUND OF THE INVENTION

The invention relates to a photographic or cinematic camera with an objective, a measuring view finder which is coupled to the objective, and a device for coordinating and indicating focal depth range and objective-setting values such as stop and distance. In a camera of this type, the measuring view finder which is coupled to the objective serves for sharply setting the sighted exposure object can also be equipped with a clearness indicator which considerably facilitates sharp focusing.

In one known camera of this type, a distance-setting ring which is provided with distance marks is rotatably arranged on the objective, which is adjustable on an index which is stationarily fixed to the objective. On both sides of the index are fixed in paris, marks for various stop figures. If a certain distance mark of the distance-setting ring coincides with the index, the stop figure marks which are located on both sides of the index, when compared with the other distance-setting marks of the objective-setting ring, indicate the so-called focal depth zone, i.e. the depth of the sharply reflected exposure (photographic) space, which is achieved with a selected stop figure. If, for example, in a camera with certain objective data, the 2 m distance mark is set on the index, the 1.5 m and 3 m distance marks face the two stop figure marks 8 and the distance marks 1.2 m and 6 m face the two stop figure marks 22. It is therefore indicated to the camera user, that with a distance setting of 2 m, the focal depth range which can be expected is from 1.5 m to 3 m with a stop figure 8, and is from 1.2 m to 6 m with a stop figure of 22.

This known device for the optically correct coordination of focal depth range and objective, setting values for stop and distance, which is usually known as a focal depth scale, can be used by the photographer to determine the desired depth of the exposure space which is desired for his motif and therefore the focal depth zone, but this process is very intricate, as no fewer than six time-consuming manipulations have to be mastered for this:

1. Focusing of the far point, that is, of the boundary point of the desired exposure space lying furthest removed from the camera;
2. Reading-off of the distance set on the distance-setting ring and noting of this distance figure;
3. Focusing of the near point and therefore of the boundary point of the desired exposure space situated nearest the camera;
4. Reading-off of the distance set thereby on the objective ring and noting of this distance figure;
5. Rotating of the distance-setting ring to a position where the two noted distance figures each face one pair of stop figure marks located on both sides of the index; and
6. Setting of the stop figure so found in the camera.

In this complicated process, the fact is really basically that the focal depth scale is not used in this way to determine the exact focal depth range, but in most cases serves merely to inform the camera user as to what focal depth can be expected with a set distance and stop. The photographer then estimates this stated focal depth range usually by comparison with the exposure object and judges whether the obtainable focal depth range is adequate for his motif or not.

The problem which therefore underlies the invention is to produce a camera of the type hereinbefore mentioned, with which the focal depth, and therefore the depth of the sharply reflected exposure space can be determined and fixed exactly with few manipulations, and in which the objective-setting values which are necessary for the desired focal depth range are made available rapidly and automatically without the photographer having to undertake time-consuming reflections and calculations. The assembly of the camera and the coordination device must be constructionally simple here, without complicated mechanical gearing, and be advantageous from a manufacturing technological point of view.

SUMMARY OF THE INVENTION

This problem is solved according to the present invention in a camera of the above-mentioned type, in that the device for coordinating and indicating focal depth range and objective-setting values has:

an Is value transmitter, which converts the distance objective-setting value into an electrical signal, a memory device connected to the Is value transmitter, for a first signal corresponding to the objective setting during focusing on a voluntarily selected far point and a second signal corresponding to the objective setting during focusing on a voluntarily selected near point, where the far and near point define the desired exposure space which is to be reflected within the focal depth range, a first calculator connected to the storage (memory) device, for determining the desired stop figure in dependence upon the stored signals, a second calculator connected to the memory device, for determining the desired distance-setting value of the objective in dependence upon the stored signals, a first comparator, which device reacts with coincidence and/or variation in the output signals of Is value transmitter and second calculator.

In the case of the camera according to the invention, the camera user merely needs to determine this focal depth range by focusing the far and near point which determines the focal depth range. Everything else is carried out automatically in the camera. The signals corresponding to the distance setting to the near point and the signals corresponding to the distance setting to the far point are stored in a memory device. From these stored signals, the first calculator calculates the stop figure which is necessary for this focal depth range, and the second calculator calculates the distance setting of the objective which is necessary for this range. The output signal, according to further specific embodiments of the invention, can either be optically, so that the photographer can set the read-off figure on the camera, or, for example, in the case of a camera with exposure time automatics—can be further processed directly for obtaining the exposure time. The output signal of the second calculator is conveyed to a comparator which is permanently connected to the Is value transmitter. The result of the comparison of the output signals of the second calculator and the Is value transmitter, which in each case represent the desired value of the distance setting and the actual value of the distance setting, can be read off by the photographer on the indicator device. The photographer need only actuate the distance-setting ring until the indicator device signals to him by a stop signal that the exact distance has been set. The photographer must therefore carry out all the following operations:

1. Sharp setting (focusing) of the desired far point in the measuring viewfinder and pressing of the memory device button,
2. Sharp setting of the desired near point and pressing of the memory device button, and
3. Actuating of the distance-setting device until the indicator device delivers a stop signal.

These few manipulations for exact determination of the focal depth range and determination of the necessary objective-setting values can be carried out by the photographer without the camera being taken away from the eye. The stop signal of the indicator device advantageously appears in the camera viewfinder. As the photographer merely had to actuate the distance-setting device and a corresponding memory device button for this, this setting operation can be carried out very rapidly. The necessary few structural elements are all of an electronic nature and in normal commercial use. The electrical connection of such electronic components is unproblematical, so that the construction of the camera is altogether exceptionally advantageous from a manufacturing technology point of view.

One specific embodiment of the invention is distinguished by a second comparator which is connected to the output of the first calculator and which is fed with an electrical signal characterizing the largest stop figure of the objective, and has at least one first output, at which a signal occurs if the desired stop figure ascertained by the first calculator is larger than the largest stop figure of the objective. In this design of the invention, the camera recognizes when the stop figure which is necessary for a focal depth range is larger than the highest stop figure available in the objective and can therefore not be set. According to further specific embodiments of the invention, this result is signalled to the photographer either via an indicator device, so that with a new determination of the focal depth range, he can reduce the latter, and/or is simultaneously conveyed to an erasing device which is thereby activated and erases the stored signals, so that the photographer is obliged to determine the focal depth range again.

According to a further specific embodiment of the invention, there is connected to the output of the first calculator, a known control circuit for the automatic determination of the exposure time in dependence upon the brightness of the object, sensitivity of the film and the stop.

In this way, the desired stop figure ascertained by the first calculator is used to ascertain the necessary exposure time.

According to a further specific embodiment of the invention, a third comparator which is connected to the output of the control circuit and which is charged with a signal corresponding to a predetermined maximum exposure time, and has at least one first output, at which an output signal occurs if the exposure time which is determined by the control circuit is longer than the predetermined exposure time. A fourth indicator device connected to the third comparator shows coincidence or variation in the two exposure times, so that the camera user, when the warning signal in the indicator device lights up, recognizes that the predetermined maximum exposure time has not been reached. He is again obliged to reduce the focal depth range in order to be able, with the given brightness of the object and the sensitivity of the film which is used, to take an exposure with a maximum predetermined exposure time, for example, 1/30 sec, for manual exposures.

In a further specific embodiment of the invention, the Is value transmitter for the distance objective-setting value is constructed as an incremental path transmitter which is connected to the inputs of a reversible digital counter, also known as an up/down counter, whose reset input is connected to a manually operable pulse switch. Such as incremental path transmitter produces, in known manner, impulses the number of which is proportional to a traveled path. This incremental path transmitter can be connected mechanically, for example, to the objective-setting ring, a distance-setting ring located in the camera body or to the movable part of the objective, so that in each case it comprehends the setting movement of this part. During focusing on the far point, the incremental path transmitter will deliver impulses to the digital counter and set it. By manual closing of the pulse switch, the digital counter is put back into its initial position. If focusing on the near point takes place, the incremental path transmitter delivers an appropriate number of impulses which are counted by the counter, so that after focusing on the near point has taken place, there occurs at the counter output a certain binary combination which represents a dimension of the depth of the exposure space and therefore of the difference in the distance from the far point to the near point. As the counter is constructed as a reversible digital counter, it is of no importance if, during focusing, the actual focal point is overrun several times in different directions.

According to a further specific embodiment of the invention, the memory device is constructed as a digital memory device (latch), whose inputs are connected to the outputs of the digital counter and whose latch-enable input is connected to a manually operable pulse switch. The binary combination which occurs at the outputs of the reversible digital counter as a result of the movement of the objective, is accepted in the memory device by manual closing of the pulse switch and occurs as a corresponding binary combination at the outputs of the memory device. If the pulse switch is opened again, the binary combination at the outputs of the digital counter or at the inputs of the memory device can be varied as desired, without the binary combination at the outputs of the memory device being affected thereby.

According to a further specific embodiment of the invention, the first calculator is composed of a digital analog converter whose digital inputs are connected to the outputs of the digital memory device and of a resistance whose first connection is connected to the analog output of the digital analog converter and whose second connection forms the output of the first calculator. The resistance value represents the input dimension of the permitted circle of divergence in the image space, which is necessary in order to calculate the desired stop figure according to an equation which has still to be explained. It is sufficient for qualitatively useful pictures if this divergence circle diameter is fixed at 50 $\mu$.

According to a further specific embodiment of the invention, this resistance is adjustably constructed and has a settinf scale which is calibrated in diameter dimensions of the permitted circle of divergence of the object point which is reflected in the image (picture) plane. As a result of this, the photographer has the possibility of varying the size of the diameter of the circle of divergence for certain photographic purposes.

According to a further specific embodiment of the invention, the second calculator and first comparator are combined into one structural unit which is composed of a digital comparator with two input series. The n bit inputs of the one input series are connected to the n bit outputs of the digital counter, the n-1 bit inputs of the second input series are connected to the 2 bit to n bit outputs of the digital memory device and the n bit input of the second input series is connected to zero potential. This simple construction of the second calculator in conjunction with the comparator can be achieved by an approximate calculation of the necessary desired distance setting with a predetermined focal depth range, which is not examined in greater detail in the specification. According to this calculation, the desired distance is half the difference in the distances of the far and near point. As a result of the aforedescribed construction of the second calculator and the comparator, the desired value transmitter must be adjusted until the counter state, i.e. the number of counting impulses comprehended in the counter, is half the impulses stored in the memory device. The first indicator device delivers a signal as soon as this state of the counter is reached, by which the exact distance setting of the objective within the predetermined focal depth range is given.

Further specific embodiments of the invention are represented in the claims, to which reference is expressly made herein.

BRIEF DESCRIPTION OF THE DRAWINGS

The invention is explained in greater detail hereafter by reference to an exemplified embodiment which is represented in the drawing wherein.

DETAILED DESCRIPTION OF THE PREFERRED EMBODIMENTS

Figure 1:
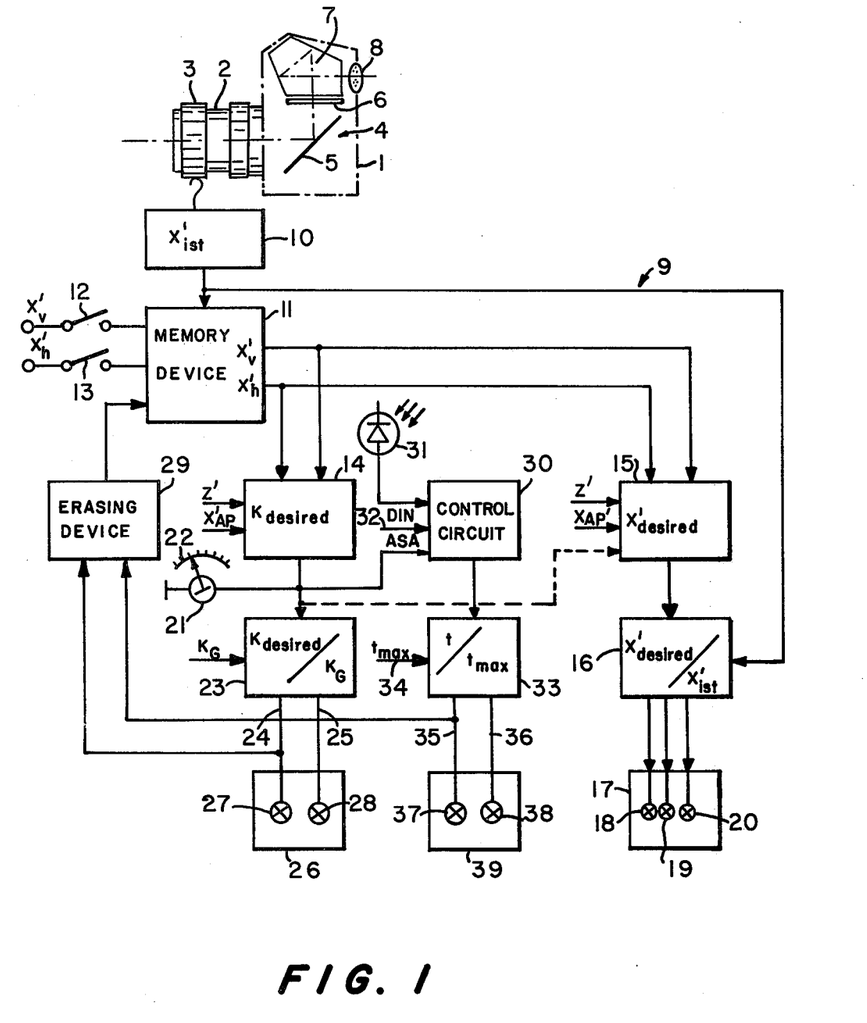
FIG. 1 shows a block diagram of the fundamental construction of the camera according to the invention.

In the block diagram in FIG. 1, the camera housing 1 is represented in dot-dash lines. The objective 2 is mounted on the front of the camera, which objective carries a rotatable setting ring 3 for distance-setting. In the camera housing 1 is provided a measuring viewfinder 4 which is constructed as a reflex viewfinder and is composed of a pivotable mirror 5, a setting disc 6, a pentaprism 7 and an eyepiece 8. A clearness indicator, such as for example, a measuring wedge prism or microscreen, can be provided in the measuring viewfinder in order to facilitate sharp setting of the exposure object on the setting disc 6.

The device 9 for optically correct coordination and indication of focal depth range and stop and distance objective-setting values has a series of structural elements which are described in greater detail hereafter.

An Is value transmitter 10, which converts the objective-setting value for distance into an electrical signal is coupled in FIG. 1 to the setting ring 3 via a mechanical feeler. The mechanical feeler is responsive to the rotating movement of the setting ring and converts this rotation into corresponding electrical signals. The mechanical feeler of the Is value transmitter 10 can, however, be coupled to a distance-setting mechanism located in the camera housing 1 or directly to the adjustable lens mounting of the objective and in each case be responsive to the adjusting movements of these elements.

The output of the Is value transmitter 10 is connected to a memory device 11, in which two signals can be stored either individually or in a mathematical combination. The storage of the signals takes place by closing the two memory device switches 12 and 13, whereby in each case, the signal occurring at the output of the Is value transmitter 10 is accepted in the memory device 11. If the objective 2 is focused on an optional far point by rotating the setting ring 3, there occurs at the output of the Is value transmitter 10, a signal $x_v'$ which corresponds to this distance which signal, through temporary closing of the memory device switch 12, is accepted in the memory device 11. Similarly, when focusing an optional near point, there occurs at the output of the Is value transmitter 10, a signal $x_h'$, which corresponds to the distance of the near point and is accepted in the memory device when the memory device switch 13 is pressed. The desired depth of the exposure space which is to be sharply reflected is fixed by these two points and defined by the signals $x_v'$ and $x_h'$, which are stored in the memory device 11. As is evident from the graphic representation in FIG. 3, the signals $x_v'$ and $x_h'$ are a dimension for the spacing of the front or rear clearness plane from the focal point $F^x$ of the objective.

The memory device 11 is connected to a first calculator 14 for determining the desired stop figure $k_{desired}$ in dependence upon the stored signals $x_v'$ and $x_h'$. The desired stop figure is ascertained by the calculator in accordance with the following equation:

$$k = \frac{x_h' - x_v'}{2z'} \cdot \frac{1}{1 - \frac{x_h' + x_v'}{2x'_{AP}}} \tag{1}$$

where $x'_{AP}$ = the spacing of the exit pupil AP from the focal point F of the objective, and $z'$ = the diameter of the permitted circle of divergence in the film plane.

Figure 3:
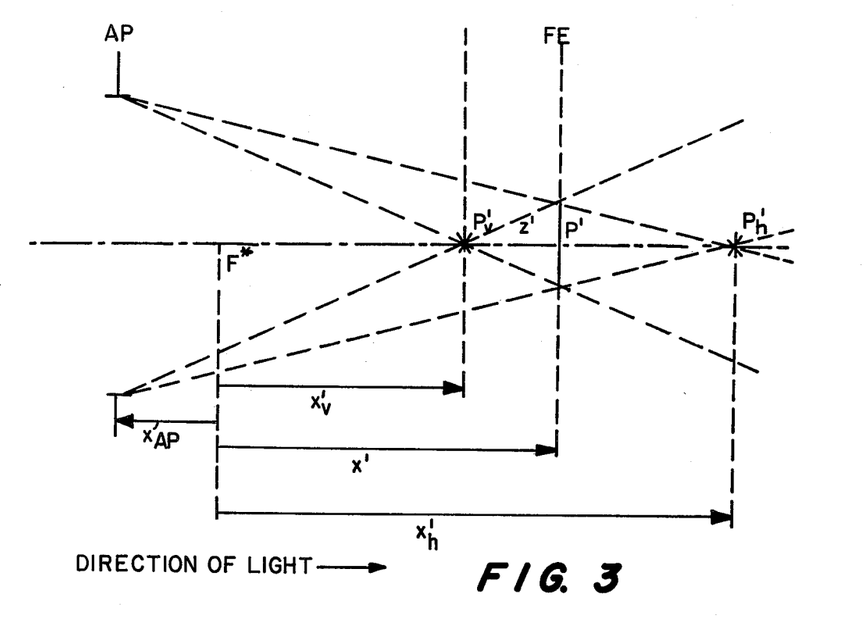
FIG. 3 shows a graphic representation to explain the definition of the optical computational figures used in the specification.

The graphic representation of the values $x'_{AP}$ and $z'$ can likewise be gathered from FIG. 3. The value $x'_{AP}$ is an objective constant and is introduced into the first calculator 14 as an input figure. In the case of varying objectives, it must be ensured that in each case the corresponding $x'_{AP}$ value is introduced into the calculator. The $z'$ value is essentially standardized, and in normal cameras reaches 50 μ. This $z'$ value is likewise introduced as an input figure in the first calculator 14. For special purposes it may be desirable for this $z'$ value to be variable. In such cases a setting device must be provided for the $z'$ value, said device being manually adjustable and connected at its output with the first computer 14.

The memory device 11 is furthermore connected to a second calculator 15, which determines the desired distance-setting value $x'_{desired}$ of the objective in dependence upon the stored signals $x_v'$ and $x_h'$ in accordance with the following equation:

$$x' = \frac{x_v' + x_h'}{2}\left[1 - \left(\frac{x_v' - x_h'}{x_v' + x_h'}\right)\frac{z' \cdot k}{x'_{AP}}\right] \tag{2}$$

In the graphic representation in FIG. 3, this desired distance-setting value represents the position of the film plane based on the focal point F of the objective, frequently also called the extension length. The values $z'$ and $x'_{AP}$ are likewise introduced into the second calculator 15 as input figures. In order to produce a simple construction of the calculator 15, the output of the first calculator 14 can be connected to the input of the second calculator 15—as represented in dotted lines in FIG. 1. In this case, the desired stop figure ascertained by the first calculator 14 from the values $x_h'$, $x_v'$, $z'$ and $x'_{AP}$ can be introduced into the second calculator 15, so that the latter does not have to carry out the same computing operation again, which, as can easily be seen from the equations (1) and (2), would be the case if the second calculator 15 merely had to process the input figure $x_v'$, $x_h'$, $z'$ and $x'_{AP}$.

To the output of the second calculator 15 is connected a first comparator 16, which on the other hand is connected to the output of the Is value transmitter 10. In this first comparator 16 there occurs a comparison of the desired distance-setting value $x'_{desired}$, ascertained by the second calculator 15, with the actual Is distance-setting value $x'_{actual}$ which is set on the objective. The result of this comparison is conveyed to a first indicator device 17, which is connected to the first comparator 16. This indicator device contains 3 indicator elements 18, 19 and 20, which are connected to the outputs of the first comparator 16 in such a way that the indicator element 18 reacts when $x'_{actual} < x'_{desired}$; the indicator element 19 reacts when $x'_{actual} = x'_{desired}$; and the indicator element 20 reacts when $x'_{actual} > x'_{desired}$. If the two indicator elements 18 and 20 are quenched by the preferably optical indicator elements 18, 19 and 20, and only the indicator element 18 lights up, the desired distance $x'_{desired}$ is set in the objective.

The output of the first calculator 14 is furthermore connected to a second indicator device 21, which, in the exemplified embodiment in FIG. 1, is constructed as a galvanometer. The indicator device has a scale 22 which is calibrated in stop figures, whereby the desired stop figure $k_{desired}$ ascertained by the first calculator 14 can be read off.

The output of the first calculator 14 is furthermore connected to a second comparator 23, to which a signal denoting the maximum stop figure of the objective $k_G$ is conveyed as an input figure. This maximum stop figure is an objective constant. In a camera with varying objectives, care must be taken that this respective objective constant is introduced into the second comparator 23. The comparator 23 compares the desired stop figure $k_{desired}$ ascertained by the first calculator 14 with the maximum settable stop figure $k_G$ of the objective. The second comparator 23 has two outputs. At the first output 24 there occurs a signal when $k_{desired}$ ascertained by the first calculator 14 on the basis of the predetermined focal depth range cannot be set with the objective. At the second output 25 of the second comparator 23 there occurs a signal when $k_{desired} \leq k_G$. To both outputs 24 and 25 of the second comparator 23 is connected a third indicator device 26, which has two indicator elements 27 and 28, each of which are connected to one of the two outputs 24 and 25 of the second comparator 23. The two indicator elements 27 and 28, which preferably deliver an optical signal, react as soon as a signal occurs at one of the outputs 24 or 25 of the second comparator 23. To the first output 24 of the second comparator 23 is connected an erasing device 29, whose output is connected to the erasing input of the memory device 11. As soon as a signal occurs at the output 24 of the second comparator 23, the erasing device 29 is activated and the signals $x_v'$ and $x_h'$ are erased.

In the exemplified embodiment in FIG. 1, the camera is constructed as a known so-called exposure time mechanism. To this end, it has a known control circuit 30 for automatic determination of the exposure time in dependence upon brightness of the object, film sensitivity and stop. The brightness of the object is measured by a photoelement 31 and introduced into the control circuit 30. This film sensitivity is introduced into the control circuit 30 via a so-called DIN or ASA setter 32. The input of the stop figure occurs by connecting the output of the first calculator 14 to the corresponding input of the control circuit 30. From these introduced figures, the control circuit 30 ascertains in known manner the necessary exposure time t.

A third comparator 33 is connected, on the one hand, to the output of the control circuit 30, and on the other hand, to a setter (not shown) on line 34 for an optionally predeterminable maximum exposure time $t_{max}$. Such a predetermined maximum exposure time is, for example, 1/30 sec., which constitutes the limit for manual exposures. The third comparator 33 compares the exposure time t ascertained by the control circuit with the predetermined maximum exposure time $t_{max}$, and delivers a signal at its first output 35 when $t > t_{max}$ and delivers a signal to its second output 36 when $t \leq t_{max}$. Two indicator elements 37 and 38 of a fourth indicator device 39 are connected to the outputs 35 and 36 respectively, and react when a signal occurs at the respective outputs. The first output 35 of the third comparator 33 is connected to the erasing device 29. As soon as a signal occurs at the first output 35, the quenching device 29 is activated and the memory device 11 is quenched.

The mode of operation of the camera represented in the block wiring diagram in FIG. 1 is as follows:

The photographer must firstly determine his focal depth range. To this end, he focuses initially on a desired far point. For this purpose, he rotates the setting ring 3 until the far point is seen to be sharp in the measuring viewfinder 4. A corresponding electrical signal occurs at the output of the Is value transmitter 10. The photographer now actuates the memory device switch 12, and the signal occurring at the output of the Is value transmiter 10 is received in the memory device as a memory device signal $x_v'$. The photographer now focuses in the same way on a desired near point. As soon as this point appears sharp in the measuring viewfinder 4, the photographer presses the memory device switch 13, and the signal occurring at the output of the Is value transmitter 10 is received in the memory device 11 as a memory device signal $x_h'$.

The first calculator 14 ascertains in accordance with equation (1) the desired stop figure $k_{desired}$, which the photographer can read off on the stop figure scale 22 of the second indicator device 21. If the desired stop figure $k_{desired}$ ascertained by the calculator 14 is larger than the settable maximum stop figure of the objective, the indicator element 27 lights up and shows the photographer that the desired focal depth range cannot be obtained. Simultaneously, the erasing device 29 which erases the memory device 11 is activated, as the stored signals are zeroed. The photographer is obliged to determine his focal depth range again, that is to say, to reduce it. If the desired stop figure ascertained can be set on the camera objective, the indicator element 28 of the third indicator device 26 lights up, and an OK signal is given to the photographer.

After the focal depth range has been determined, the photographer now has to set the necessary exact distance. This distance $x'_{desired}$ is ascertained by the second calculator 15 and conveyed to the first comparator 16. The photographer now has to rotate the setting ring 3 until the two indicator elements 18 and 20 in the first indicator device 17 are erased and the indicator element 19 lights up. The two indicator elements 18 and 20 thereby give him, by appropriate illumination, an instruction as to whether he must move the setting ring in the direction of a larger or smaller distance.

If the camera is a manual camera, or if the camera operates manually by switching off the automatics which are usually provided, the photographer must adjust the stop figure $k_{desired}$ read off on the second indicator device on the stop figure setter of the camera, introduce a corresponding exposure time, and can therefore take the exposure. If the camera, as in the exemplified embodiment of FIG. 1, is an exposure time automatic device, and if the automatics are switched on, the second indicator device 21 serves merely as additional information for the photographer. From the measured object brightness, the controlled film sensitivity, and the desired stop figure $k_{desired}$ which is ascertained by the first calculator 14, the control circuit 30 ascertains the exposure time t in known manner. This exposure time t is compared in the third comparator 33 with a voluntarily predetermined maximum exposure time, for example, 1/30 sec., as a figure for manual exposure. If the exposure time t is larger than the introduced longest exposure time $t_{max}$, the indicator element 37 of the fourth indicator device 39 lights up and signals to the photographer that in view of the existing object brightness, an adequately lighted exposure is impossible with the desired focal depth range. At the same time, the erasing device 29 which erases the memory device signals present in the memory device is activated. The photographer is once again obliged to determine the focal depth range anew, and likewise reduce it. On the other hand, if the indicator element 38 of the fourth indicator device lights up, all the marginal conditions for an optimal photographic exposure are fulfilled, and the indicator element 39 likewise gives the photographer an OK signal. If, therefore, the indicator elements 29, 38 and 19 light up, and the other indicator elements are dark, the photographer can actuate the release.

In order to be able to obtain such a construction of the camera of the invention in a technologically very simple manner, the first calculator 14 and the second calculator 15 are combined, so that they do not calculate the desired stop figure and the desired distance in accordance with the exact equations (1) and (2), but according to permitted proximity formulae which are adequate for practical requirements. Therefore, the desired stop figure is determined in the calculator 14 in accordance with:

$$k = \frac{x_h' - x_v'}{2z'} \quad (3)$$

and in the calculator 15 the desired distance in accordance with:

$$x' = \frac{x_v' + x_h'}{2} \quad (4)$$

In this case, the additional input of the $x'_{AP}$ value into the two calculators 14 and 15 is unnecessary.

Figure 2:
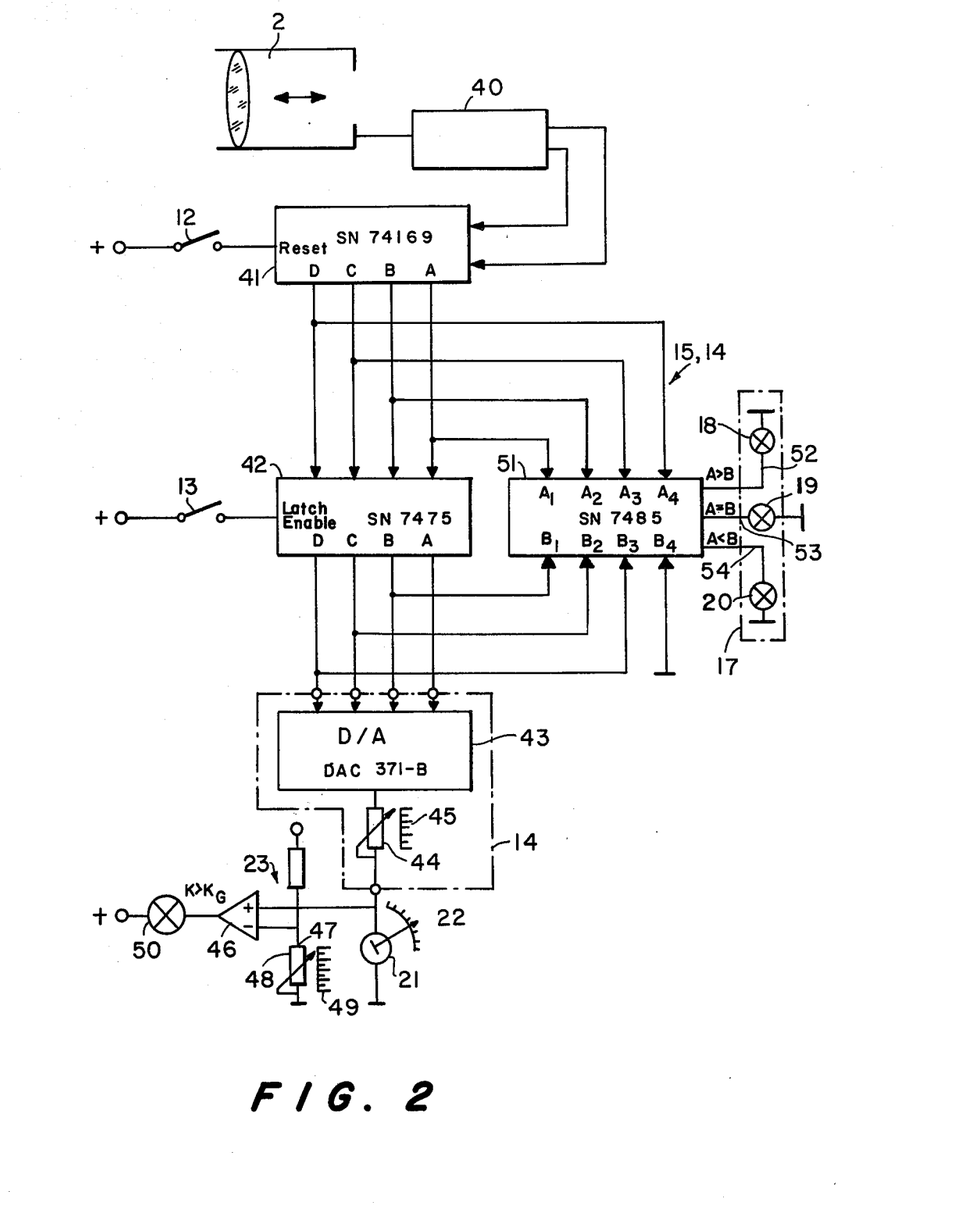
FIG. 2 shows the schematic diagram of one possible technical exemplified embodiment.

FIG. 2 shows an embodiment of the invention in which the calculators 14 and 15 for the stop and distance calculations take on a simple technological form.

The Is value transmitter 10 is here constructed as an incremental path transmitter 40, which is responsive to the shifting movement of the objective 2 during the distance setting, and delivers a number of impulses corresponding to the extent of the shifting to a reversible digital counter 41, as for example, an up/down counter. When the objective 2 is moved in the opposite direction, the incremental path transmitter 40 creates impulses of opposite polarity.

The reversible digital counter 41 is constructed as a forward/backward binary counter, such as is sold, for example, by Texas Instruments Model No. SN 74169. The two inputs for positive and negative counting impulses of the counter 41 are connected to the two outputs of the incremental path transmitter 40. The reset input of the counter 41 is connected via the memory device switch 12 to a plus potential. The outputs of the digital counter 41 are connected to the inputs of a binary memeory device 42. Such a memory device is likewise in normal commercial use and may be, for example, distributed by Texas Instruments Model No. SN 7475. The latch-enable input of the memory device 42 is connected via the second memory device swtich 13 to plus potential. Furthermore, a digital analog converter 43 is provided, whose digital inputs are connected to the corresponding outputs of the memory device 42. Such a digital analog converter is similarly in normal commercial use and is, for example, sold by Hybrid Systems as an 8 bit digital analog converter Model No. DAC 371-8. To the analog output of the digital analog converter 43 is connected a resistance 44, which is preferably adjustably constructed. Digital analog converter 43 and resistance 44 form the first calculator 14, whose inputs are the digital inputs of the digital analog converter 43 and whose output is the free connection of the resistance 44. The z' value, and therefore the permitted diameter of the circle of divergence in the film plane, is set with the resistance 44. In addition, a scale 45 which is calibrated in diameter dimensions of the permitted circle of divergence can be provided on the resistance 44.

The second indicator device 21, as in FIG. 1, is formed by a galvanometer which is connected to the output of the calculator 14 or to the resistance 44. The second comparator 23 is a comparator 46, whose non-inverting input is connected to the output of the calculator 14 or of the resistance. The inverting input of the comparator 46 is connected to a potential divider 47, by which the maximum stop figure $k_G$ of the respective objective 2 is set. For this purpose, there is fixed to the adjustable resistance 48 of the potential divider 47, a scale 49 which is calibrated in stop figures. At the output of the comparator 46 is located a preferably optical indicator element 50, which corresponds in mode of operation to the indicator element 27 in FIG. 1. This indicator element 50 is connected to plus potential and lights up when the signal at the non-inverting input of the comparator 46 is larger than at the inverting input, which means that the desired stop figure ascertained by the calculator 14 is larger than the largest settable stop figure of the objective.

As a result of the approximate determination of the desired distance in accordance with the approximate equation (4), the second calculator 15 and the comparator 16 can be combined into one unit and realized by a single structural element, that is to say, through a binary comparator 51. Such a binary comparator is known and distributed by Texas Instruments as Model No. SN 7485. The binary comparator 51 has two input series, which are marked with $A_1$ to $A_4$ or $B_1$ to $B_4$. All the inputs $A_1$ to $A_4$ are connected to the outputs A to D of the binary counter 41. Of the four inputs $B_1$ to $B_4$ of the binary comparator 51, the first bit input $B_1$ is connected to the second bit output B of the memory device 42, the second bit input $B_2$ is connected to the third bit output C, the third bit input $B_3$ to the fourth bit output D of the memory device 42, and the fourth bit input $B_4$ is connected to zero potential. The exemplified embodiment in FIG. 2 is fabricated from 4 bit modules. Naturally, a finer graduation of the distance measurement can be achieved by a multi-stage forward/backward binary counter 41. If the binary counter 41 is an n staged counter with corresponding n bit outputs, the binary memory device 42 and the binary comparator 51 generally is connected such that the n bit inputs $A_1$ to $A_n$ of the one input series are connected to the n bit outputs of the digital counter 41, and such that the n-1 bit inputs $B_1$ to $B_{n-1}$ of the second input series are each connected to the 2nd bit to n bit output of the binary memory device 42, and that the n bit input $B_n$ of the second input series is connected to zero potential. The binary comparator 51 has three outputs 52, 53 and 54, which are connected respectively to indicator elements 18, 19 and 20 of the first indicator device 17. At the first output 52 of the binary comparator 51 there occurs a signal as long as half the counter content of the binary counter 41 is larger than the memory device contents of the binary memory device 42. A signal occurs at the second output 53 of the binary comparator 51 if the memory device contents of the binary memory device 42 and half the counter content of the binary counter 41 are identical, and a signal occurs at the third output 54 of the binary comparator 51 when the memory device content of the binary memory device 42 is smaller than half the counter contents of the binary counter 41. As soon as a signal occurs at the putput 52–54 of the binary comparator 51, the respective indicator elements 18–20 respectively is energized.

The mode of operation of the exemplified embodiment of the camera according to the invention is as follows:

As described with reference to FIG. 1, the photographer has to focus the objective 2 on the far point by operating the distance-setting ring, and then close the memory device switch 12 for a short period. The forward/backward binary counter 41 is thereby set in its initial position via the reset input. The photographer now focuses on the near point. A corresponding number of impulses is conveyed to the counter 41. As the counter 41 is a forward/backward counter, impulses are in each case counted up or down as would occur, for example, with repeated overrunning of the objective near the focusing point as the operator adjusts the objective to the near point focus. If the near point is focused, the counter contains a binary number which corresponds to the difference between the near point and far point, that is $$\Delta x' = x_h' - x_v'. \tag{5}$$

By closing the memory device switch 13 for a short while, the information $\Delta x'$ is stored in the binary memory device 42.

The content of the binary memory device 42 is converted by the digital analog converter 43 into an analog signal. The signal which corresponds to the z' value is set at the resistance 44, so that at the output of the first calculator 14 (i.e. at the output of the resistance 44) there occurs an analog signal which satisfies the equation $$k = \Delta x'/2z'. \tag{6}$$

This analog signal is indicated by the galvanometer 21 on the stop figure scale 22, and simultaneously conveyed to the comparator 46. If this signal is larger than the maximum possible stop figure on the objective, the indicator element 50 lights up and the photographer must make his focal depth range smaller, whereby the aforedescribed procedure is repeated. If the analog signal at the output of the resistance 44 is smaller than or equal to the largest possible stop figure of the objective, the indicator element 50 shows no signal and the photographer knows that he has selected an acceptable focal depth range. Now he must also set the necessary desired distance exactly, for which he actuates the stop-setting ring until the indicator element 19 lights up and the indicator elements 18 and 20 are quenced. In this procedure, the necessary desired distance is calculated by the binary comparator in accordance with the following equation:

$$x' = x_v' + (\Delta x'/2). \tag{7}$$

As a result of the aforedescribed connection of the input series of the binary comparator 51 to the outputs of the binary counter 41 and of the binary memory device 42, the 1 to n bits of the binary counter 41 are compared with the 2 to n+1 bits of the binary memory device 42, whereby the n+1 bits is predetermined by zero potential. It thereby occurs that the second output 53 of the binary memory device 51 gives a signal when the counter content 41 amounts to half the memory device 42 content, so that the equation (7) is satisfied if it is borne in mind that the $x_v'$ value is represented by the initial or zero position of the binary counter 41.

The stop figure value indicated in the galvanometer 21 can be set on the stop setter of the camera. A corresponding exposure time control circuit 30 can likewise be connected to the output of the calculator 14 or to the output of the resistance 44, as in FIG. 1. As the latter is known per se, an additional representation and description of the exposure time control circuit is unnecessary.

What is claimed is:

1. A photographic camera having an objective, a viewfinder coupled to said objective and comprising:
   (a) means for converting the setting of said objective into electrical signal values, $x'_{actual}$,
   (b) memory storage means for storing said electrical signal values, said memory storage means storing a first signal value, $x_v'$, corresponding to the objective setting associated with a far point desired to be photographed, and for storing a second signal value, $x_h'$, corresponding to the objective setting associated with a near point desired to be photographed, and (c) calculator means connected to said memory storage means for automatically calculating a desired stop figure, $k_{desired}$, and a desired distance-setting value, $x'_{desired}$, associated with said first and second signal values.

2. A photographic camera as recited in claim 1 further comprising means for indicating the desired stop figure, $k_{desired}$.

3. A photographic camera as recited in claim 1 further comprising first comparator means connected to said converting means and said calculator means for comparing the desired distance-setting value $x'_{desired}$ with the actual objective setting value, $x'_{actual}$, and means for indicating the equivalent of same.

4. A photographic camera as recited in claim 3 wherein said calculator means comprises a first calculator for calculating the desired stop figure, $k_{desired}$, and a second calculator for calculating the desired distance setting value $x'_{desired}$.

5. A photographic camera as recited in claim 4 further comprising means for indicating the desired stop figure, $k_{desired}$, said indicating means connected to said first calculator.

6. A photographic camera as recited in claim 5 further comprising second comparator means connected to said first calculator for comparing the desired stop figure $k_{desired}$ with a reference value corresponding to the largest stop figure for the camera objective, $k_G$, and means for providing an indication when $k_{desired} > k_G$.

7. A photographic camera as recited in claim 6 further comprising means for erasing said first and second signal values.

8. A photographic camera as recited in claim 7 wherein said erasing means is connected to said first calculator for erasing said first and second signal values, said erasing means operable when $k_{desired}$ is greater than $k_G$.

9. A photographic camera as recited in claim 6 further comprising means for providing an indication when $k_{desired} \leq k_G$.

10. A photographic camera as recited in claim 1 further comprising a brightness control circuit connected to said calculator means for automatically determining exposure time, t, in response to film sensitivity, object brightness and the desired stop figure, $k_{desired}$.

11. A photographic camera as recited in claim 10 further comprising a comparator for comparing said exposure time, t, to a predetermined maximum exposure time, $t_{max}$, and means for indicating when $t > t_{max}$.

12. A photographic camera as recited in claim 11 further comprising means for indicating when $t \leq t_{max}$.

13. A photographic camera as recited in claim 10 further comprising means for erasing said stored electrical signal values when $t > t_{max}$.

14. A photographic camera as recited in claim 1 wherein said means for converting the setting of the objective into electrical signal values comprises an incremental path transmitter.

15. A photographic camera as recited in claim 14 wherein said incremental path transmitter provides digital signals, and said camera further comprises a reversible digital counter providing digital signals to said memory storage device in response to said digital signals from said incremental path transmitter.

16. A photographic camera as recited in claim 14 wherein said calculator means comprises a digital-to-analog converter connected to said memory storage means and a variable resistor means connected to an output of said digital-to-analog converter.

* * * * *